(12) United States Patent
Kaplan et al.

(10) Patent No.: US 9,189,417 B2
(45) Date of Patent: Nov. 17, 2015

(54) SPECULATIVE TABLEWALK PROMOTION

(71) Applicant: Advanced Micro Devices, Inc., Sunnyvale, CA (US)

(72) Inventors: David A. Kaplan, Austin, TX (US); Stephen P. Thompson, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 245 days.

(21) Appl. No.: 13/672,188

(22) Filed: Nov. 8, 2012

(65) Prior Publication Data
US 2014/0129794 A1 May 8, 2014

(51) Int. Cl.
*G06F 12/10* (2006.01)

(52) U.S. Cl.
CPC ............ *G06F 12/1027* (2013.01); *G06F 12/10* (2013.01); *G06F 12/1009* (2013.01)

(58) Field of Classification Search
CPC .................................................. G06F 12/1027

USPC ......................................................... 711/205
See application file for complete search history.

(56) References Cited

U.S. PATENT DOCUMENTS

| 5,680,565 | A | * | 10/1997 | Glew et al. ..................... 711/205 |
| 2013/0103923 | A1 | * | 4/2013 | Pan ............................... 711/207 |

* cited by examiner

*Primary Examiner* — Cheng-Yuan Tseng
*Assistant Examiner* — Zubair Ahmed

(57) ABSTRACT

A method includes performing a speculative tablewalk. The method includes performing a tablewalk to determine an address translation for a speculative operation and determining whether the speculative operation has been upgraded to a non-speculative operation concurrently with performing the tablewalk. An apparatus is provided that includes a load-store unit to maintain execution operations. The load-store unit includes a tablewalker to perform a tablewalk and includes an input indicative of the operation being speculative or non-speculative as well as a state machine to determine actions performed during the tablewalk based on the input. The apparatus also includes a translation look-aside buffer. Computer readable storage devices for performing the methods and adapting a fabrication facility to manufacture the apparatus are provided.

26 Claims, 5 Drawing Sheets

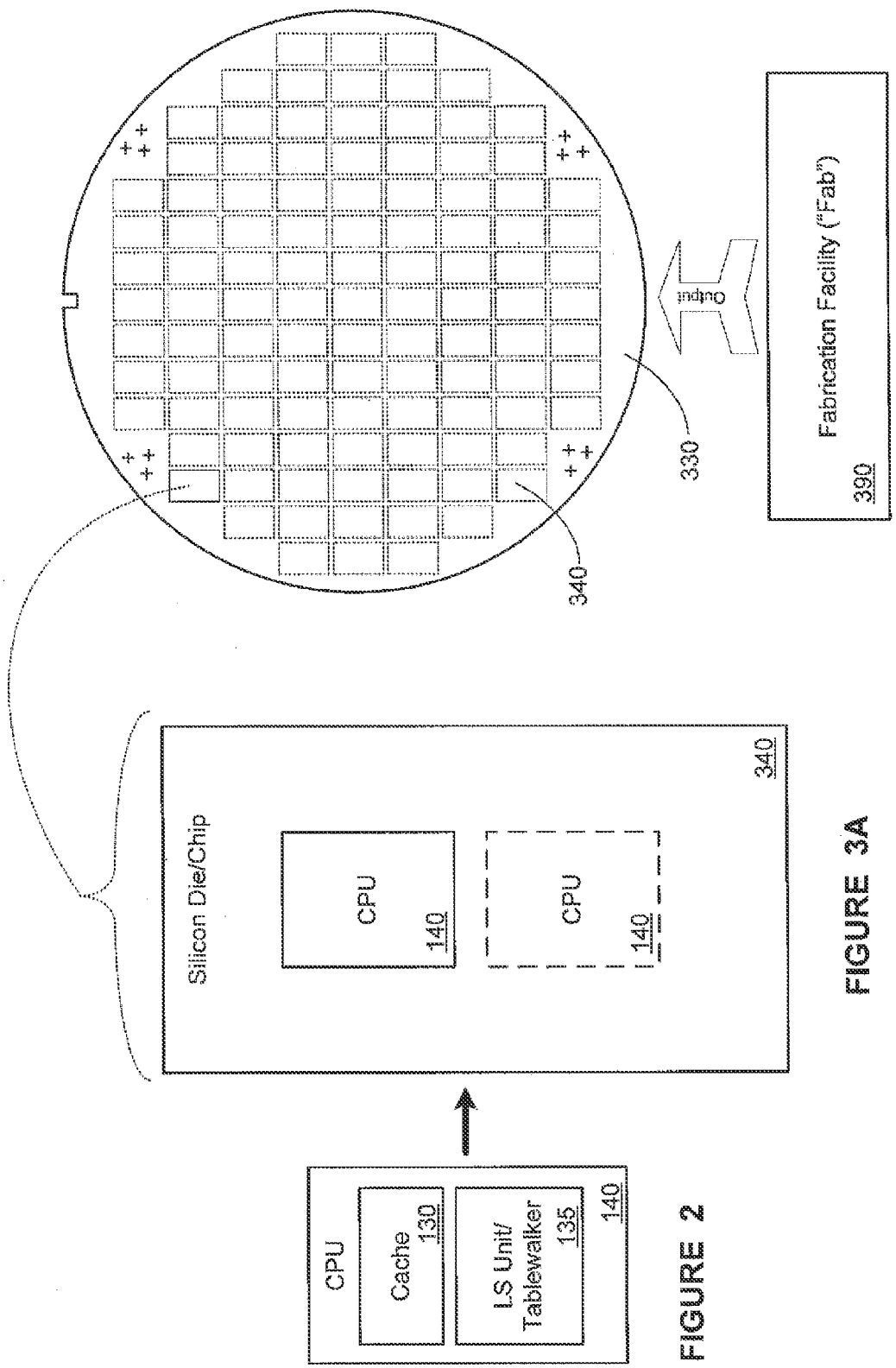

SPECULATIVE TABLEWALK PROMOTION

BACKGROUND

1. Technical Field

Embodiments presented herein relate generally to computing systems and processing devices, and, more particularly, to a method and apparatus for implementing a promotion of a speculative operation during a tablewalk in a processing device.

2. Description of Related Art

Processor-based devices such as central processing units (CPUs), graphics processing units (GPUs), or accelerated processing units (APUs) that implement virtual memory systems use a page table to store the mapping between the virtual addresses and physical addresses in memory. Conventional processor-based devices may also implement a translation lookaside buffer (TLB) that can cache mappings of virtual addresses to physical addresses. For example, the TLB can cache virtual-to-physical address mappings of recently requested addresses. The TLB is typically implemented as content-addressable memory (CAM) that uses the virtual address as a search key and the search result is a physical address indicated by the stored mapping. If the requested address is present in the TLB, a TLB hit, the search yields a match and the retrieved physical address can be used to access memory. If the requested address is not in the TLB, a TLB miss, the translation proceeds by looking up the page table in a process called a tablewalk. The tablewalk is an expensive process that involves reading the contents of multiple memory locations and using them to compute the physical address. After the physical address is determined by the tablewalk, the virtual address to physical address mapping is entered into the TLB.

Processor-based devices may also perform speculative operations that can be canceled. For example, a speculative operation could be canceled due to a branch mis-prediction or an older exception. Electrical circuits and devices that execute instructions and process data have evolved becoming faster and more complex. With the increased performance and low power demands of modern data processor architectures (e.g., multi-core processors), considerations for performing tablewalks subsequent to cache misses has become more complex, particularly for speculative operations. In some previous solutions, speculative tablewalks are simply prohibited. In other cases, speculative tablewalks are abandoned or canceled if non-cacheable page table entries were encountered or if page table entries required modification(s). These previous solutions, however, suffer from poor performance and inefficient power utilization.

Embodiments presented herein eliminate or alleviate the problems inherent in the state of the art described above.

SUMMARY OF EMBODIMENTS

In some embodiments, a method is provided. The method includes performing a tablewalk to determine an address translation for a speculative operation and determining whether the speculative operation has been upgraded to a non-speculative operation concurrently with performing the tablewalk.

In some embodiments, a non-transitory, computer-readable storage device encoded with instructions that, when executed by a processing device, adapts the processing device to perform a method is provided. The method includes performing a tablewalk, associated with a speculative operation, to determine an address translation. Performing the tablewalk includes reading one or more addresses associated with a page table, upgrading the speculative operation to a non-speculative operation during the tablewalk in response to receiving an indication that the speculative operation is no longer speculative, and completing the tablewalk.

In some embodiments, a method is provided. The method includes performing a tablewalk, associated with a speculative operation, to determine an address translation. Performing the tablewalk includes reading one or more addresses associated with a page table. The method also includes determining if the speculative operation remains speculative subsequent to at least one of determining whether the next address is cacheable or determining whether an entry associated with the address requires updating. The method further includes upgrading the speculative operation to a non-speculative operation during the tablewalk in response to an indication that the speculative operation is no longer speculative, and completing the tablewalk.

In some embodiments, an apparatus is provided. The apparatus includes a load-store unit configured to maintain one or more operations for execution in a processing device. The load-store unit includes at least one tablewalker unit configured to perform a memory tablewalk for the one or more operations. The tablewalker unit includes at least one input indicative of whether an operation for which the tablewalk is performed is a speculative or non-speculative operation, and at least one state machine configured to determine one or more actions performed during the tablewalk based at least in part on the at least one input. The apparatus also includes at least one translation look-aside buffer (TLB) communicatively coupled to the load-store unit.

In some embodiments, a computer-readable storage device encoded with instructions that, when executed by a fabrication facility, adapts the fabrication facility to manufacture an apparatus is provided. The apparatus includes a load-store unit configured to maintain one or more operations for execution in a processing device. The load-store unit includes at least one tablewalker unit configured to perform a memory tablewalk for the one or more operations. The tablewalker unit includes an indication of whether an operation for which the tablewalk is performed is a speculative or non-speculative operation, and at least one state machine configured to determine one or more actions performed during the tablewalk based at least in part on the at least one input. The apparatus also includes at least one translation look-aside buffer (TLB) communicatively coupled to the load-store unit.

BRIEF DESCRIPTION OF THE DRAWINGS

The embodiments herein may be understood by reference to the following description taken in conjunction with the accompanying drawings in which:

FIG. 2 shows a simplified block diagram of a circuit that includes a central processing unit (CPU) and a LS Unit/Tablewalker, according to some embodiments;

FIG. 3A provides a representation of a silicon die/chip that includes one or more circuits as shown in FIG. 2, according to some embodiments;

FIG. 3B provides a representation of a silicon wafer which includes one or more die/chips that may be produced in a fabrication facility, according to some embodiments;

Figure 1:
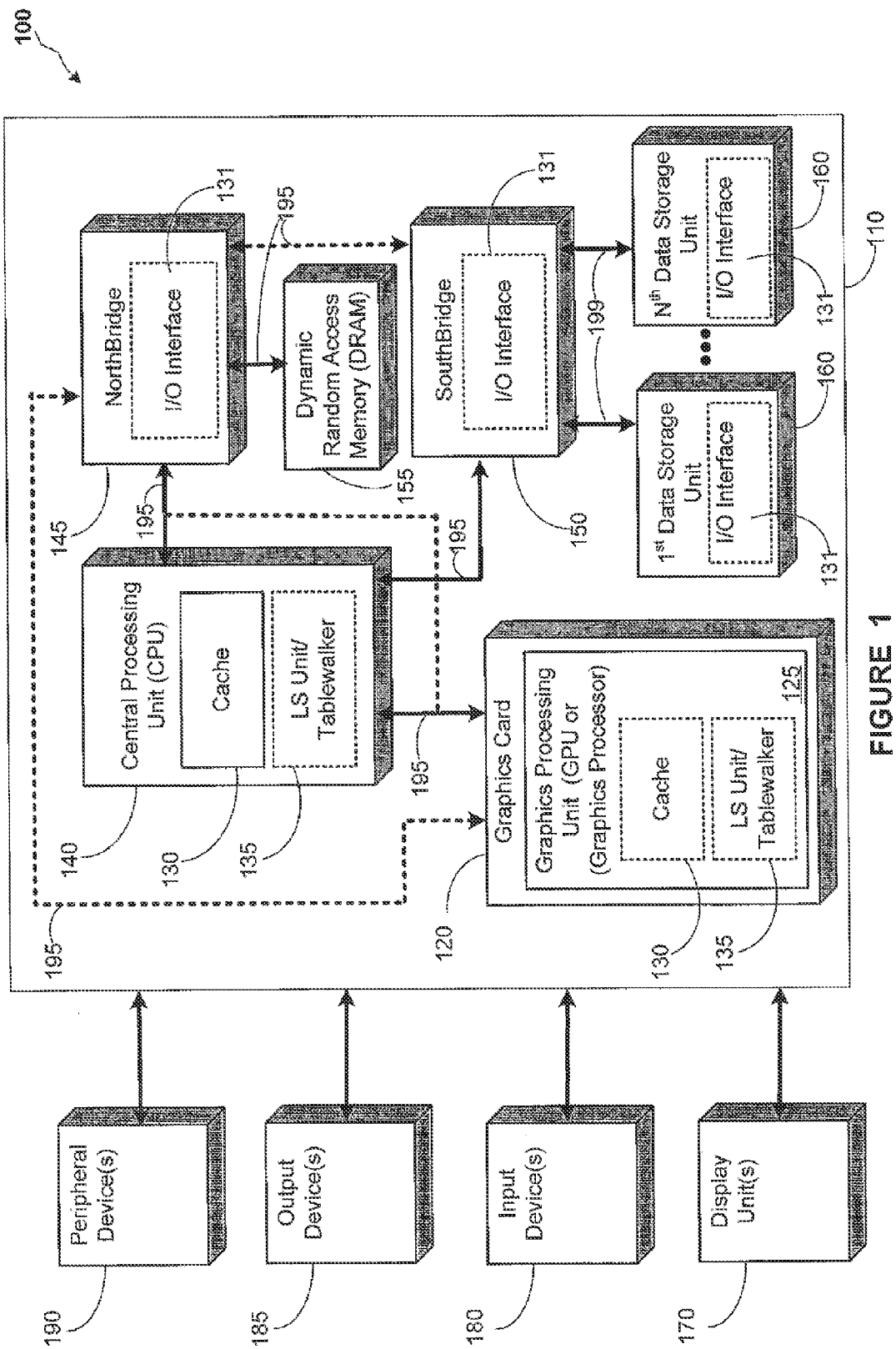
FIG. 1 schematically illustrates a simplified block diagram of a computer system, according to some embodiments.

While the embodiments herein are susceptible to various modifications and alternative forms, specific embodiments thereof have been shown by way of example in the drawings and are herein described in detail. It should be understood, however, that the description herein of specific embodiments is not intended to limit the embodiments to the particular forms disclosed, but, on the contrary, the intention is to cover all modifications, equivalents, and alternatives falling within the scope of the embodiments as defined by the appended claims.

DETAILED DESCRIPTION

Illustrative embodiments are described below. In the interest of clarity, not all features of an actual implementation are described. It will of course be appreciated that in the development of any such actual embodiment, numerous implementation-specific decisions may be made, which may vary from one implementation to another. Moreover, it will be appreciated that such a development effort might be complex and time-consuming, but may nevertheless be a routine undertaking for those of ordinary skill in the art having the benefit of this disclosure.

Embodiments of the present application will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present embodiments. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used herein, the terms "substantially" and "approximately" may mean within 85%, 90%, 95%, 98% and/or 99%. In some cases, as would be understood by a person of ordinary skill in the art, the terms "substantially" and "approximately" may indicate that differences, while perceptible, may be negligent or be small enough to be ignored. Additionally, the term "approximately," when used in the context of one value being approximately equal to another, may mean that the values are "about" equal to each other. For example, when measured, the values may be close enough to be determined as equal by one of ordinary skill in the art.

As discussed herein, data may be "maintained," "held," "kept" and/or "stored" in various data storage structures including, but not limited to, queues, memories, caches, buffers, registers, flip-flops, and/or the like. The terms "maintained," "held," "kept" and/or "stored" may be used synonymously and interchangeably herein.

As discussed herein, a "tablewalk" may include reading one or more memory locations in an attempt to determine a physical address for an operation. When a load or store operation "misses" in a translation look-aside buffer (TLB), processor hardware typically performs a tablewalk in order to determine the correct virtual-to-physical address translation. In x86 architectures, for example, this may involve reading potentially multiple memory locations, and potentially updating bits (e.g., "access" and/or "dirty" bits) in the page tables. Due to architectural restrictions, hardware may be prevented from setting bits (e.g., "access" and/or "dirty" bits) or accessing non-cacheable memory for speculative operations. However, to improve performance, it is desirable to perform tablewalks for speculative operations so their virtual-to-physical address translation can be obtained earlier. Tablewalks performed for speculative operations may be referred to as speculative tablewalks. The embodiments herein are contemplated as pertaining to data-side tablewalks as well as instruction-side tablewalks. In some embodiments, a TLB is implemented with associated page tables in cacheable or non-cacheable memory. Some conventional computer system architecture rules may require that accesses to non-cacheable memory be non-speculative, in which case a speculative tablewalk that attempted to access such regions would be aborted or abandoned. A new tablewalk could be started once the operation became non-speculative and this table walk should be able to complete.

Embodiments presented herein generally relate to a method and apparatus for implementing speculative tablewalks. As noted above, processing devices (e.g., single- and multi-core microprocessors (CPUs) and graphics processors (GPUs), or their respective individual processing cores) may perform tablewalks to obtain physical addresses for operations being executed. Allowing speculative tablewalks to be promoted dynamically to non-speculative tablewalks may improve performance and help avoid cases in which aggressive tablewalk strategies may actually hinder performance due to timing issues. The embodiments described herein allow for speculative tablewalks that may offer significant performance improvements in processing devices.

Turning now to FIG. 1, a block diagram of an example computer system 100, in accordance with some embodiments of the present application, is illustrated. In various embodiments the computer system 100 may be a personal computer, a laptop computer, a handheld computer, a tablet computer, a mobile device, a telephone, a personal data assistant ("PDA"), a server, a mainframe, a work terminal, a music player, a smart television, and/or the like, all of which may be referred to generically as processing devices. The computer system 100 includes a main structure 110 which may be a computer motherboard, circuit board or printed circuit board, a desktop computer enclosure and/or tower, a laptop computer base, a server enclosure, part of a mobile device, personal data assistant (PDA), or the like. In some embodiments, the main structure 110 includes a graphics card 120. In some embodiments, the graphics card 120 may be a Radeon™ graphics card from Advanced Micro Devices ("AMD") or any other graphics card using memory, in some embodiments. The graphics card 120 may, in different embodiments, be connected on a Peripheral Component Interconnect "(PCI") Bus (not shown), PCI-Express Bus (not shown) an Accelerated Graphics Port ("AGP") Bus (also not shown), or any other computer system connection. It should be noted that embodiments of the present application are not limited by the connectivity of the graphics card 120 to the main computer structure 110. In some embodiments, the computer system 100 runs an operating system such as Linux, UNIX, Windows, Mac OS, and/or the like. In some embodiments, the computer system 100 includes one or more system registers (not shown) adapted to store values used by the computer system 100 during various operations.

In some embodiments, the graphics card 120 contains a processing device such as a graphics processing unit (GPU) 125 used in processing graphics data. The GPU 125, in some embodiments, includes one or more embedded/non-embedded memories, such as one or more caches 130. The GPU caches 130 may be L1, L2, higher level, graphics specific/related, instruction, data and/or the like. In various embodiments, the embedded memory(ies) may be an embedded random access memory ("RAM"), an embedded static random access memory ("SRAM"), or an embedded dynamic random access memory ("DRAM"). In some embodiments, the memory(ies) are on the graphics card 120 in addition to, or instead of, being embedded in the GPU 125, for example as DRAM 155 on the graphics card 120 as shown in FIG. 1. In various embodiments the graphics card 120 may be referred to as a circuit board or a printed circuit board or a daughter card or the like.

In some embodiments, the computer system 100 includes a processing device such as a central processing unit ("CPU") 140, which may be connected to a northbridge 145. The CPU 140 may be a single- or multi-core processor, or may be a combination of one or more CPU cores and a GPU core on a single die/chip (such an AMD Fusion™ APU device). The CPU 140 may be of an x86 type architecture, an RISC type architecture, and/or the like. In some embodiments, the CPU 140 includes one or more caches 130, such as, but not limited to, L1, L2, level 3 or higher, data, instruction and/or other cache types. In some embodiments, the CPU 140 is a pipelined processor. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other computer system connection. For example, CPU 140, northbridge 145, GPU 125 may be included in a single package or as part of a single die or "chips" (not shown) or as a combination of packages. The arrangement of various components illustrated as forming part of main structure 110 may be altered. In some embodiments, the northbridge 145 is coupled to a system RAM (or DRAM) 155. In some embodiments, the system RAM 155 is coupled directly to the CPU 140. The system RAM 155 may be of any RAM type known in the art and may comprise one or more memory modules; the type of RAM 155 does not limit the embodiments of the present application. For example, the RAM 155 may include one or more DIMMs. As referred to in this description, a memory may be a type of RAM, a cache or any other data storage structure referred to herein.

In some embodiments, the northbridge 145 is connected to a southbridge 150. The northbridge 145 and southbridge 150 may be on the same chip in the computer system 100, or the northbridge 145 and southbridge 150 may be on different chips. In some embodiments, the southbridge 150 has one or more I/O interfaces 131, in addition to any other I/O interfaces 131 elsewhere in the computer system 100. In various embodiments, the southbridge 150 may be connected to one or more data storage units 160 using a data connection or bus 199. The data storage units 160 may be hard drives, solid state drives, magnetic tape, or any other writable media used for storing data. In one embodiment, one or more of the data storage units may be USB storage units and the data connection 199 may be a USB bus/connection. Additionally, the data storage units 160 may contain one or more I/O interfaces 131.

In various embodiments, the central processing unit 140, northbridge 145, southbridge 150, graphics processing unit 125, DRAM 155 and/or embedded RAM may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In some embodiments, the computer system 100 includes a load-store unit that includes a tablewalker (LS unit/Tablewalker) 135. In some embodiments, the LS Unit/Tablewalker 135 includes a tablewalker state machine (TSM) and related components adapted or configured to provide functionality for performing speculative tablewalks in the computer system 100, the CPU 140, the GPU 125, and/or their respective core(s). Components adapted to provide functionality for performing speculative tablewalks may reside in other system blocks, e.g., a retirement unit, re-order buffer (ROB) unit, a missed address buffer (MAB), a translation look-aside buffer (TLB), other blocks of the load-store (LS) unit, an address generation unit (AGU), and/or the like), or in a combination of the LS Unit/Tablewalker 135 and other system blocks. The components of the LS Unit/Tablewalker 135 are discussed in further detail below, in FIG. 4. The LS Unit/Tablewalker 135 may comprise a silicon die/chip and include software, hardware and/or firmware components. The LS Unit/Tablewalker 135 may be packaged in any silicon die package or electronic component package as would be known to a person of ordinary skill in the art having the benefit of this disclosure. In some embodiments, the LS Unit/Tablewalker 135 is a circuit included in an existing computer component, such as, but not limited to, the CPU 140, the northbridge 145, the graphics card 120 and/or the GPU 125 (or any respective cores of these components). In some embodiment, LS Unit/Tablewalker 135 is communicatively coupled to the CPU 140, the GPU 125, the northbridge 145, the RAM/DRAM 155 and/or their respective connections 195. As used herein, the terms "LS unit" or "Tablewalker" (e.g., LS Unit/Tablewalker 135) may be used to refer a physical LS Unit/Tablewalker chip or to LS Unit/Tablewalker circuitry included in a computer component, to circuitry of the LS Unit/Tablewalker 135, or to the functionality implemented by the LS Unit/Tablewalker. In accordance with some embodiments, the LS Unit/Tablewalker 135 may function as, and/or be referred to as, a portion of a processing device. In some embodiments, some combination of the GPU 125, the CPU 140, the LS Unit/Tablewalker 135 and/or any hardware/software computer 100 units respectively associated therewith, may collectively function as, and/or be collectively referred to as, a processing device. In some embodiments, the CPU 140 and LS Unit/Tablewalker 135, the GPU 125 and the LS Unit/Tablewalker 135, or the CPU 140, the northbridge 145 and the LS Unit/Tablewalker 135 and their respective interconnects may function as a processing device.

In some embodiments, the computer system 100 may be connected to one or more display units 170, input devices 180, output devices 185 and/or other peripheral devices 190. It is contemplated that in various embodiments, these elements may be internal or external to the computer system 100, and may be wired or wirelessly connected, without affecting the scope of the embodiments of the present application. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to corresponding physical digital media, a universal serial bus ("USB") device, non-volatile memory, Zip Drive, external hard drive, phone and/or broadband modem, router/gateway, access point and/or the like. The input, output, display and peripheral devices/units described herein may have USB connections in some embodiments. To the extent certain aspects of the computer system 100 are not described herein, such aspects may or may not be included in various embodiments without limiting the spirit and scope of the disclosed embodiments as would be understood by one of skill in the art.

Turning now to FIG. 2, a block diagram of an example LS Unit/Tablewalker 135 implemented in a CPU 140, in accordance with some embodiments of the present application, is illustrated. In some embodiments, the LS Unit/Tablewalker 135, CPU 140 and/or northbridge 145 may contain one or more caches 130. The LS Unit/Tablewalker 135, CPU 140 and/or northbridge 145, in some embodiments, may include L1, L2 or other level caches 130. To the extent certain aspects of the LS Unit/Tablewalker 135, CPU 140 and/or northbridge 145 and/or one or more caches 130 are not described herein, such aspects may or may not be included in various embodiments without limiting the spirit and scope of the embodiments of the present application as would be understood by one of skill in the art.

Turning now to FIG. 3A, in some embodiments, the LS Unit/Tablewalker 135, CPU 140, and the cache(s) 130 may reside on a silicon chips/die 340 and/or in the computer system 100 components such as those depicted in FIG. 1. The silicon chip(s) 340 may be housed on the motherboard (e.g., 110) or other structure of the computer system 100. In some embodiments, there may be more than one LS Unit/Tablewalker 135, CPU 140 and/or caches 130 on each silicon chip/die 340. As discussed above, various embodiments of the LS Unit/Tablewalker 135 or CPU 140 may be used in a wide variety of electronic devices.

Turning now to FIG. 3B in accordance with some embodiment, and as described above, one or more of the LS Unit/Tablewalker 135 or CPU 140 may be included on the silicon die/chips 340 (or computer chip). The silicon die/chips 340 may contain one or more different configurations of the LS Unit/Tablewalker 135 or CPU 140. The silicon chips 340 may be produced on a silicon wafer 330 in a fabrication facility (or "fab") 390. That is, the silicon wafers 330 and the silicon die/chips 340 may be referred to as the output, or product of, the fab 390. The silicon die/chips 340 may be used in electronic devices, such as those described above in this disclosure.

Figure 4:
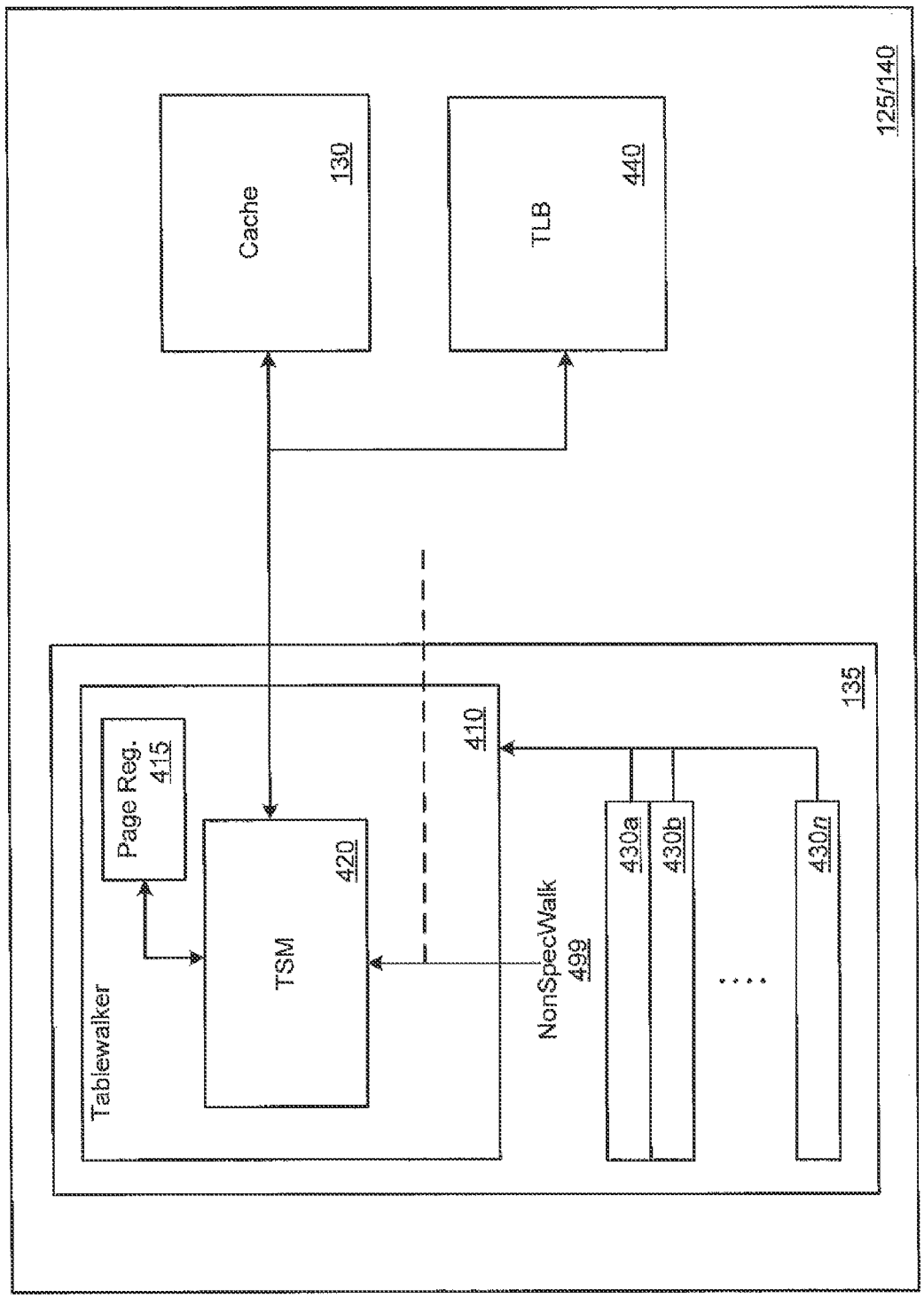
FIG. 4 illustrates a simplified block diagram of the LS Unit/Tablewalker of FIG. 2 in the context of a computer processor, according to some embodiments.

Turning now to FIG. 4, a graphical representation of the LS Unit/Tablewalker 135 and example circuitry, in accordance with some embodiments, is shown. The LS Unit/Tablewalker 135 may be part of a CPU 140, a GPU 125, and/or their respective core(s). The LS Unit/Tablewalker 135 may be communicatively coupled to a cache 130 (e.g., an L1 cache and/or and L2 cache), to a TLB 440, and to additional CPU 140 and/or GPU 125 components (not shown) related to performing tablewalks, are not described in detail herein, but would generally be understood by one of ordinary skill in the art having the benefit of this disclosure.

The LS Unit/Tablewalker 135 may, in some embodiments be or comprise an LS Unit. The LS Unit/Tablewalker 135 may include a tablewalker unit 410. The tablewalker unit 410 may be configured to perform tablewalks for one or more operations in the system when a TLB lookup for an address associated with the operation(s) "misses" the TLB 440. In various embodiments, the tablewalker unit 410 performs tablewalks for speculative or non-speculative operations. The LS Unit/Tablewalker 135 also includes one or more entries 430*a-n* configured to hold or maintain one or more operations during the execution and/or tablewalks thereof. The entries 430*a-n* may store or maintain the operations as well as data or information related to the operations. In some embodiments, the data or information related to the operations includes, but is not limited to, the address of the operation, the memory type of the operations, a state of the operation related to its execution in a processing device, a state of the operation related to its speculative/non-speculative status, the relative age of the operation, and/or the like.

The tablewalker unit 410 includes one or more page registers 415 which may store or maintain data associated with the current page and type of a tablewalk. The tablewalker unit 410 includes one or more tablewalk state machines (TSM) 420, the operation of which is described in further detail below and with respect to FIG. 5. The TSM 420 may include an input indicative of the current state of an operation, such as whether the operation is currently speculative or non-speculative. According to some embodiments, the TSM 420 may include hardware portions, software portions, and/or a combination of the two. In some embodiments, this input may be the NonSpecWalk signal 499. In various embodiments, the NonSpecWalk signal 499 is transmitted to the TSM 420 in real-time or approximately in real-time. In some embodiments, the NonSpecWalk signal 499 is provided by the LS Unit/Tablewalker 135 itself, while in some embodiments, the NonSpecWalk signal 499 is provided by one or more components of the CPU 140 and/or GPU 125. In some embodiments, the value of the NonSpecWalk signal 499 may be determined from all, or portions of, the data or information related to the operations that may be stored in the entries 430*a-n*. In some embodiments, the tablewalker 410 and/or TSM 420 may reach a state that requires it to perform specific actions (e.g., writing access/dirty bits or reading non-cacheable memory). In such cases, the tablewalker 410 and/or TSM 420 may examine the NonSpecWalk signal 499. If this signal indicates that the operation is not speculative, the tablewalk may be allowed to proceed. If the operation is speculative, the walk may be abandoned and a signal is sent to one or more components of the LS Unit/Tablewalker 135 indicating this status. For example, abandoning the tablewalk may generate an error condition and no physical address mapping may be returned. In some embodiments, the tablewalker 410 and/or TSM 420 does not sample the NonSpecWalk signal 499 until the TSM 420 reaches a state that requires performance of an action that may be abandoned if the operation is speculative. In some embodiments, it is contemplated that the tablewalker 410 and/or TSM 420 may not reach such a state in a given tablewalk, in which case the tablewalk may complete normally regardless of the speculative/non-speculative state of the operation.

The determination of the value of the NonSpecWalk signal 499 may be made in based on different criteria according to various embodiments: 1) if the operation that initiated the tablewalk is currently considered non-speculative (e.g., it is the oldest un-retired operation); 2) an address associated with an operation that is the oldest un-retired operation is included in the virtual page of the current tablewalk operation; and 3) if another initially speculative operation associated with the currently non-speculative operation that initiated the tablewalk subsequently becomes non-speculative (e.g., by being the oldest un-retired operation). The first condition takes into account the fact that an operation may have initiated a tablewalk speculatively, but has since become non-speculative, for example, through older operations retiring. The second condition allows a tablewalk operation to be promoted or upgraded to non-speculative status if the currently oldest operation matches the current tablewalk operation. A speculative tablewalk operation may be upgraded, for example, when an older operation is executed and finds that it needs the same address information as the speculative operation. Such a matching may be performed by checking the upper virtual address bits of the older operation and comparing these bits to the upper bits of the speculative operation that initiated the tablewalk. In addition, the "type" of tablewalk may be checked, and this may insure, for example, that if a store initiated the tablewalk, only another store operation may promote the tablewalk to non-speculative status. In this way, problem cases related to "dirty" bits for example, which may only be set for stores, can be avoided. The third case allows for a promoted operation (speculative to non-speculative) to then upgrade a speculative tablewalk operation.

In some embodiments, the "type" of tablewalk, the address bits, the relative age, and the like, are stored in the page register 415. The page register 415 may be loaded when a tablewalk is commenced. When operations are executed in the LS Unit/Tablewalker 135 execution pipeline (not shown), a comparison may be made between the page register 415 and the executed operation. If a match is found, and the executed operation was non-speculative, the NonSpecWalk signal 499 may be set to indicate that the tablewalk operation is non-speculative. Once asserted, the NonSpecWalk signal 499 may only cleared at the end of the tablewalk, in some embodiments.

It is contemplated that various components of the tablewalker unit 410, the TSM 420, and/or the LS Unit/Tablewalker 135 may be conceptually grouped as being part of the tablewalker unit 410, the TSM 420, and/or the LS Unit/Tablewalker 135. The example groupings and placements of the various components described in FIG. 4 are illustrative and convenient for their discussion and description, but are not to be considered as limiting the scope of the embodiments described herein.

Figure 5:
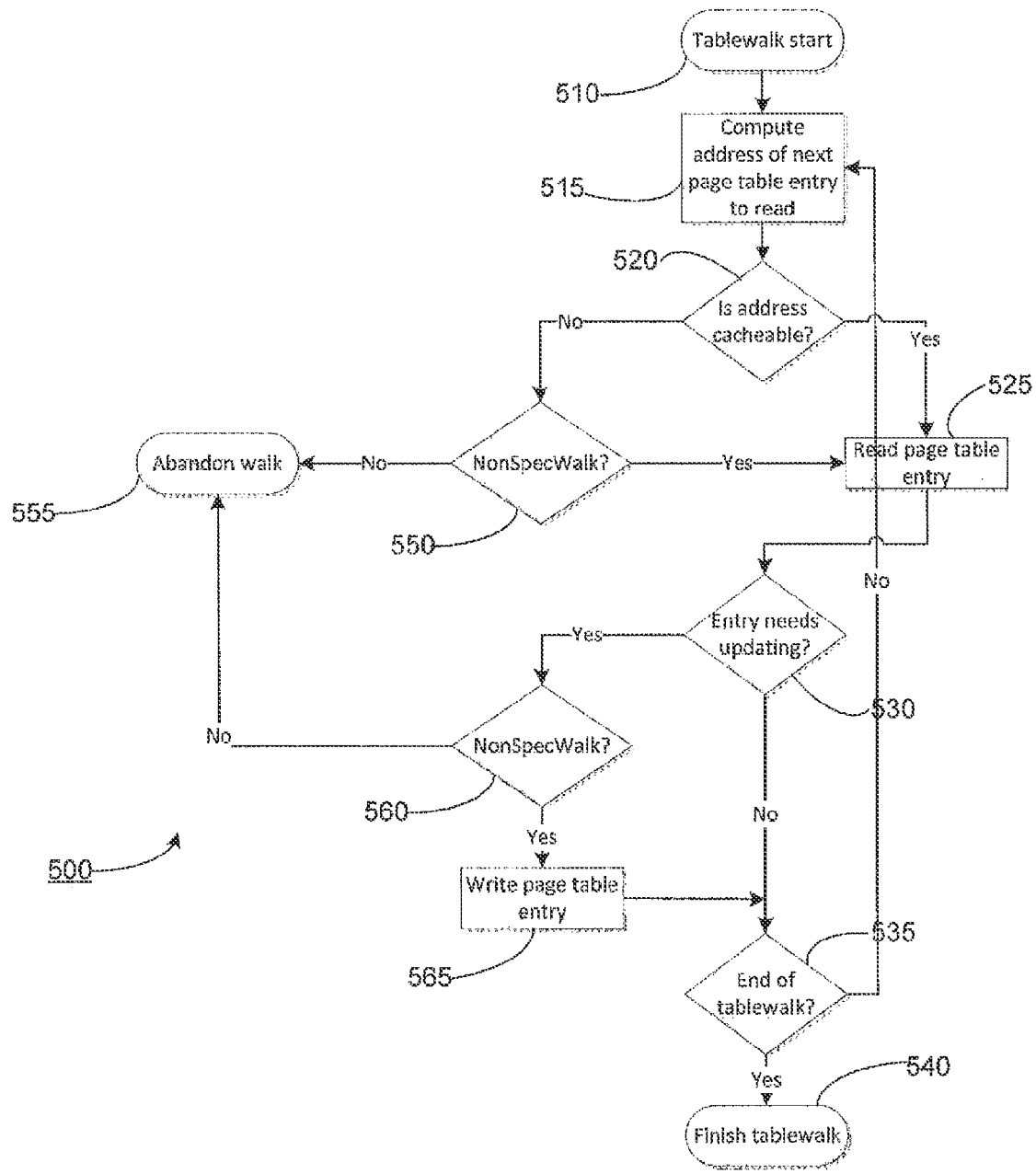
FIG. 5 illustrates a flowchart depicting a speculative tablewalk, according to some embodiments.

FIG. 5 shows a simplified flowchart depicting a tablewalk 500 (e.g., speculative tablewalk) that may be performed by a state machine such as the TSM 420 shown in FIG. 4, in accordance with some embodiments. The process steps 515, 520, 525, 530, 535 in the tablewalk 500 are used to perform a lookup of an entry in the page table that includes the virtual-to-physical address translations. The loop may be performed one or more times depending on the structure of the page tables. For example, three iterations of the loop may be used to look up a physical address in a memory page in a three-level page table. As discussed herein, events may occur during the tablewalk 500 that may cause the tablewalk for a speculative operation to be abandoned. However, initially speculative operations may be upgraded or promoted to non-speculative status during execution of the loop. The tablewalk 500 shown in FIG. 5 therefore includes decision blocks (e.g., the decision blocks 550, 560) that use the current status (e.g., speculative or non-speculative status indicated by the NonSpecWalk signal 499 shown in FIG. 4) of the operation to decide whether to abandon the tablewalk.

At 510, a tablewalk may begin, for example, as performed by the tablewalker unit 410 using the TSM 420. From 510, the flow may proceed to 515 where an address of the next page table entry to be read during the tablewalk is computed and/or determined. For example, the state machine may determine (at 515) a pointer to the location of the "next" page table entry. In some embodiments, a page table may be of different sizes and contain a plurality of addresses. During the tablewalk 500, one or more of the page table entry addresses may be read before completion of the tablewalk. Upon determining the address of the next page table entry, the flow proceeds to 520 where it is determined if the address is cacheable. A non-cacheable address may cause a tablewalk for a speculative operation to be abandoned. Thus, if the state machine determines (at 520) that the next address is not cacheable, the flow proceeds to 550 where it is determined whether the operation that initiated the tablewalk is speculative. If the operation is speculative, the tablewalk is abandoned at 555. For example, if the NonSpecWalk signal 499 indicates that the operation was speculative, or has not been upgraded to non-speculative status prior to the determination at 520, the flow proceeds to 555 for abandonment.

The contents of the page table entry may be read (at 525) using the address of the operation (e.g., a subset of the bits of the address that indicates the offset from the base address calculated in 515) if the address is cacheable or the tablewalk is non-speculative. For example, if the state machine determines (at 550) that the operation is non-speculative, the flow may continue to 525 where the page table entry indicated by the address determined at 515 is read. For another example, if the address is determined (at 520) to be cacheable, the flow proceeds to 525 where the page table entry indicated by the address determined at 515 is read. Depending on the level of the current page table, the entry may include a pointer, an address, or a virtual-to-physical address translation. For example, the lookup may provide a pointer to the next page table level or a physical address at the lowest level of a multilevel page table.

From 525, the flow may proceed to 530 where it is determined whether the page table entry indicated by the address determined at 515 requires updating. Updating the page table entry may include, but is not necessarily limited to, writing "access" and/or "dirty" bits associated with the entry. If updating is required (530), the flow may proceed to 560 to determine if the operation is currently speculative or non-speculative. As discussed herein, speculative operations may be prohibited from performing entry updates such as writing "access" and/or "dirty" bits associated with the entry If the state machine determines (at 560) that the operation is speculative, the tablewalk is abandoned (at 555). If the operation is non-speculative, the flow may continue to 565 where the page table entry may be written, e.g., to update access or dirty bits associated with the entry. From 565, the flow may proceed to 535. Similarly, from 530, if no updating is required for the current entry, the flow may proceed to 535. At 535, it may be determined if the tablewalk should conclude or continue. For example, if the last address of the page has been read, the tablewalk 500 may conclude at 540. Otherwise, the tablewalk may continue by proceed back to 515 (described above).

Figure 6:
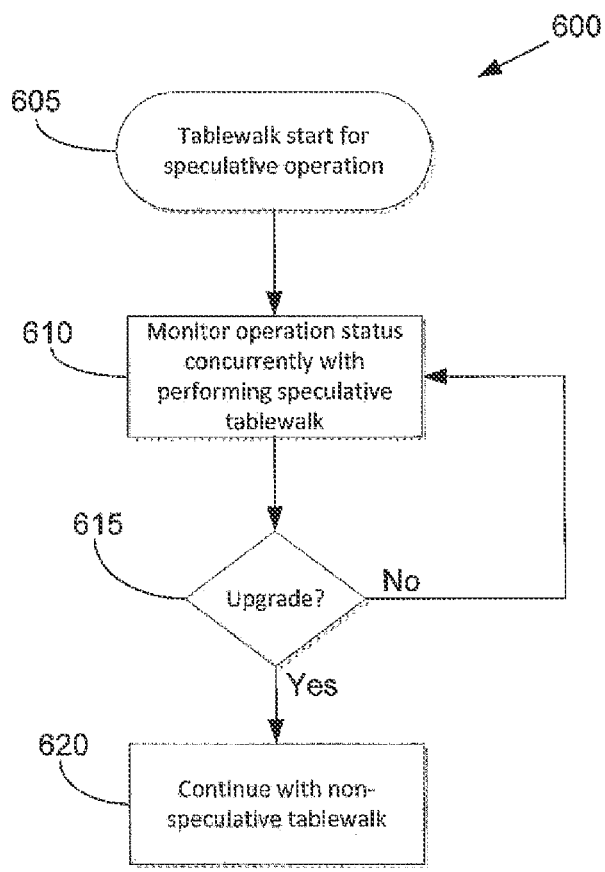
FIG. 6 shows a simplified flowchart depicting a tablewalk that may be performed by a state machine such as the state machine shown in FIG. 4, in accordance with some embodiments.

FIG. 6 shows a simplified flowchart depicting a tablewalk 600 that may be performed by a state machine such as the TSM 420 shown in FIG. 4, in accordance with some embodiments. The tablewalk 600 is initially performed for a speculative operation and is therefore referred to as a speculative tablewalk. The speculative tablewalk starts (at 605), e.g., in response to a miss to a translation lookaside buffer. As the tablewalk proceeds, the state machine monitors (at 610) the status of the speculative operation concurrently with performing the speculative tablewalk. The state machine determines (at 615) whether the status of the speculative operation has been upgraded to non-speculative. Exemplary conditions that may cause the speculative operation to be upgraded to a non-speculative include retirement of older operations, the currently oldest operation matching the current tablewalk operation, or an older operation being executed and finding that it needs the same address information as the speculative operation. However, persons of ordinary skill in the art having benefit of the present disclosure should appreciate that other conditions may also lead to upgrading of the speculative operation to non-speculative status.

The state machine continues to monitor (at 610) the operation status concurrently with performing the speculative tablewalk as long as the state machine does not determine (at 615) that the speculative operation has been upgraded. However, the state machine may modify the status of the tablewalk to treat the tablewalk as a non-speculative tablewalk in response to the state machine determining (at 615) that the speculative operation has been upgraded to a non-speculative status. The state machine may then continue (at 620) performing the non-speculative tablewalk. As discussed herein, the upgraded, non-speculative tablewalk may not be abandoned when it encounters conditions that would cause a speculative tablewalks to be abandoned.

Some embodiments of the tablewalks 500 or 600 depicted in FIGS. 5 and 6 allow tablewalks for speculative operations to proceed until they encounter a condition that may require the speculative tablewalk to be abandoned. Exemplary conditions that may cause speculative tablewalks to be abandoned including encountering non-cacheable addresses relating to update entries, e.g. by writing or modifying access bits or dirty bits associated with the entry. The tablewalk is abandoned if the operation remains speculative when the condition is encountered. However, the tablewalk is allowed to continue if the operation has been upgraded to non-speculative status by the time the condition is encountered. As discussed herein, a speculative operation can be upgraded to non-speculative status in response to the retirement of older operations, when the currently oldest operation matches the current tablewalk operation, when an older operation is executed and finds that it needs the same address information as the speculative operation, or under other circumstances. Embodiments of the tablewalks 500 or 600 shown in FIGS. 5 and 6 may therefore achieve a performance benefit relative to conventional practice because the results of tablewalks performed for speculative operations may be utilized as long as the speculative operation has been upgraded or promoted to non-speculative status before the operation encounters an abandonment condition.

It is contemplated that the elements as shown in FIGS. 5 and 6 may not be limited to the order in which they are described above. In accordance with some embodiments, the elements shown in FIGS. 5 and 6 may be performed sequentially, in parallel, or in alternate order(s) without departing from the spirit and scope of the embodiments presented herein. It is also contemplated that the flowcharts may be performed in whole, or in part(s), in accordance with some embodiments presented herein. That is, the flowcharts shown in FIGS. 5 and 6 need not perform every element described in some embodiments.

Some embodiments of the tablewalks 500, 600 shown in FIGS. 5 and 6 may be represented as instructions that are encoded onto a transitory or non-transitory computer-readable storage media. The instructions may be read from the storage media by a process device such as the system 100 shown in FIG. 1 that can be configured to execute the instructions to perform embodiments of the tablewalk 500, 600.

Further, it is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In some embodiments, the HDL code (e.g., register transfer level (RTL) code/data) may be used to generate GDS data, GDSII data and the like. GDSII data, for example, is a descriptive file format and may be used in some embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 155 (including embedded RAMs, SRAMs and/or DRAMs), caches 130, compact discs, DVDs, solid state storage devices and/or the like). In some embodiments, the GDSII data (or other similar data) may be adapted to configure a manufacturing facility (e.g., through the use of mask works) to create devices capable of embodying various aspects described herein, in the instant application. In other words, in various embodiments, this GDSII data (or other similar data) may be programmed into a computer, processor or controller, which may then control, in whole or part, the operation of a semiconductor manufacturing facility (or fab) to create semiconductor products and devices. For example, in some embodiments, silicon wafers containing one or more CPUs 140, GPUs 125, LS Unit/Tablewalker 135, hardware state machines and/or algorithms (not shown), caches 130, and/or the like may be created using the GDSII data (or other similar data).

It should also be noted that while various embodiments may be described in terms of the LS Unit/Tablewalker associated various processors, it is contemplated that the embodiments described herein may have a wide range of applicability, for example, in various devices that include processing devices, as would be apparent to one of skill in the art having the benefit of this disclosure.

The particular embodiments disclosed above are illustrative only, as the embodiments herein may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope of the claimed embodiments.

Accordingly, the protection sought herein is as set forth in the claims below.

The invention claimed is:

1. A method, comprising:
 initiating a tablewalk to determine an address translation for a speculative operation;
 determining, concurrently with performing the tablewalk, whether the speculative operation has been upgraded to a non-speculative operation concurrent with execution of the tablewalk; and
 completing the tablewalk in response to determining that the speculative operation has been upgraded to a non-speculative operation concurrent with execution of the tablewalk.

2. The method of claim 1, wherein performing the tablewalk comprises computing an address of a next page table entry to read and determining whether the computed address is cacheable.

3. The method of claim 2, comprising abandoning the tablewalk in response to determining that the computed address is not cacheable and in response to receiving a signal indicating that the speculative operation has not been upgraded to a non-speculative operation concurrent with execution of the tablewalk.

4. The method of claim 2, wherein performing the tablewalk comprises reading the page table entry indicated by the address in response to determining that the address is cacheable or in response to receiving a signal indicating that the speculative operation has been upgraded to a non-speculative operation.

5. The method of claim 4, wherein reading the page table entry comprises determining whether the page table entry associated with the address requires updating.

6. The method of claim 5, comprising abandoning the tablewalk in response to determining that the page table entry requires updating and in response to receiving an indication that the speculative operation has not been upgraded to a non-speculative operation.

7. The method of claim 5, further comprising writing the page table entry in response to determining that the page table entry requires updating and in response to receiving an indication that the speculative operation has been upgraded to a non-speculative operation.

8. The method of claim 1, further comprising:
transmitting the indication that the speculative operation is no longer speculative to a tablewalker unit in a load-store unit of a computing device, wherein the indication is transmitted in response to a determination that the speculative operation is no longer speculative due to at least one of:
a determination that an oldest, un-retired operation in the load-store unit has the same virtual address page and the same type as the speculative operation; and
a determination that the speculative operation has become the oldest, un-retired operation in the load-store unit.

9. The method of claim 1, further comprising performing the tablewalk in response to an address miss during a translation look-aside buffer (TLB) lookup.

10. The method of claim 1, further comprising completing the tablewalk subsequent to upgrading the speculative operation.

11. A method, comprising:
performing a tablewalk, associated with a speculative operation, to determine an address translation, wherein performing the tablewalk comprises:
reading one or more addresses associated with a page table entry;
determining, concurrent with performing the tablewalk, if the speculative operation remains speculative subsequent to at least one of:
determining whether the next address is cacheable; and
determining whether the page table entry requires updating;
upgrading the speculative operation to a non-speculative operation concurrent with performing the tablewalk the tablewalk in response to an indication that the speculative operation is no longer speculative; and
completing the tablewalk in response to upgrading the speculative operation.

12. A computer-readable storage device encoded with instructions that, when executed by a processing device, adapt the processing device to perform a method, the method comprising:
performing a tablewalk, associated with a speculative operation, to determine an address translation, wherein performing the tablewalk comprises:
reading one or more addresses associated with a page table entry;
upgrading the speculative operation to a non-speculative operation concurrent with performing the tablewalk in response to receiving an indication that the speculative operation is no longer speculative; and
completing the tablewalk in response to upgrading the speculative operation.

13. The computer-readable storage device encoded with instructions that, when executed by a processing device, adapt the processing device to perform the method as in claim 12, wherein reading the one or more addresses comprises:
determining a next address to read; and
determining whether the next address is cacheable.

14. The computer-readable storage device encoded with instructions that, when executed by a processing device, adapt the processing device to perform the method as in claim 13, wherein reading the one or more addresses further comprises:
performing a read of the address in response to determining that the address is cacheable;
determining whether the speculative operation has been upgraded to a non-speculative operation in response to determining that the address is not cacheable; and
performing at least one of:
abandoning the tablewalk in response to determining that the speculative operation has not been upgraded to a non-speculative operation; and
performing a read of the address in response to determining that the speculative operation has been upgraded to a non-speculative operation.

15. The computer-readable storage device encoded with instructions that, when executed by a processing device, adapt the processing device to perform the method as in claim 14, further comprising:
performing at least one subsequent address read without a subsequent determination as to whether the speculative operation has been upgraded to a non-speculative operation.

16. The computer-readable storage device encoded with instructions that, when executed by a processing device, adapt the processing device to perform the method as in claim 12, wherein reading the one or more addresses comprises:
determining a next address to read;
determining whether an entry associated with the address requires updating; and
determining whether the speculative operation has been upgraded to a non-speculative operation in response to determining that the entry associated with the address requires updating.

17. The computer-readable storage device encoded with instructions that, when executed by a processing device, adapt the processing device to perform the method as in claim 16, further comprising at least one of:
abandoning the tablewalk in response to determining that the speculative operation has not been upgraded to a non-speculative operation; and
performing an update of the entry associated with the address in response to determining that the speculative operation has been upgraded to a non-speculative operation.

18. The computer-readable storage device encoded with instructions that, when executed by a processing device, adapt the processing device to perform the method as in claim 17, further comprising:

performing at least one subsequent entry update without a subsequent determination as to whether the speculative operation has been upgraded to a non-speculative operation.

19. The computer-readable storage device encoded with instructions that, when executed by a processing device, adapt the processing device to perform the method as in claim 12, further comprising:
completing the tablewalk further comprises completing the tablewalk subsequent to upgrading the speculative operation.

20. The computer-readable storage device encoded with instructions that, when executed by a processing device, adapt the processing device to perform the method as in claim 12, further comprising at least one of:
determining a plurality of addresses associated with a page table to read during the tablewalk and reading the plurality of addresses prior to completing the tablewalk; and
transmitting a signal, during the tablewalk, indicative that the speculative operation is no longer speculative to a tablewalker unit in a load-store unit of a computing device, wherein the signal is transmitted in response to a determination that the speculative operation is no longer speculative due to at least one of:
a determination that an oldest, un-retired operation in the load-store unit has the same virtual address page and the same type as the speculative operation; and
a determination that the speculative operation has become the oldest, un-retired operation in the load-store unit.

21. An apparatus, comprising:
a load-store unit configured to maintain one or more operations for execution in a processing device, the load-store unit comprising:
at least one tablewalker unit configured to perform a memory tablewalk for the one or more operations, the tablewalker unit comprising:
at least one input indicative of whether an operation for which the tablewalk is performed is a speculative or non-speculative operation; and
at least one state machine configured to determine, concurrent with performing the tablewalk, if the operation has been upgraded from a speculative operation to a non-speculative operation during the memory tablewalk based on one or more actions performed during the memory tablewalk; and
at least one translation look-aside buffer (TLB) communicatively coupled to the load-store unit.

22. The apparatus of claim 21, further comprising:
a cache communicatively coupled to at least one of the load-store unit and the TLB, wherein the cache is at least one of a level one (L1) cache, a level two (L2) cache, or a level three (L3) cache.

23. The apparatus of claim 21, wherein the load-store unit comprises one or more entries configured to store the one or more operations respectively.

24. The apparatus of claim 23, wherein the one or more entries are further configured to maintain data relating to at least one of an operation type, an operation address, and a state of an operation.

25. The apparatus of claim 21, wherein the at least one tablewalker unit is further configured to:
perform a tablewalk associated with a speculative operation;
read one or more addresses associated with a page table entry;
upgrade the speculative operation to a non-speculative operation during the tablewalk in response to receiving an indication that the operation has become non-speculative; and
complete the tablewalk subsequent to the speculative operation being upgraded.

26. A computer-readable storage device encoded with data that, when executed by a fabrication facility, adapts the fabrication facility to manufacture an apparatus, where the apparatus comprises:
a load-store unit configured to maintain one or more operations for execution in a processing device, the load-store unit comprising:
at least one tablewalker unit configured to perform a memory tablewalk for the one or more operations, the tablewalker unit comprising:
at least one input indicative of whether an operation for which the tablewalk is performed is a speculative or non-speculative operation; and
at least one state machine configured to determine, concurrent with performing the tablewalk, if the operation has been upgraded from a speculative operation to a non-speculative operation during the memory tablewalk based on one or more actions performed during the memory tablewalk; and
at least one translation look-aside buffer (TLB) communicatively coupled to the load-store unit.

* * * * *